Oct. 9, 1923.
C. STEENSTRUP
METHOD OF MANUFACTURING TURBINE ELEMENTS
Filed Dec. 23, 1921
1,470,508
2 Sheets-Sheet 1
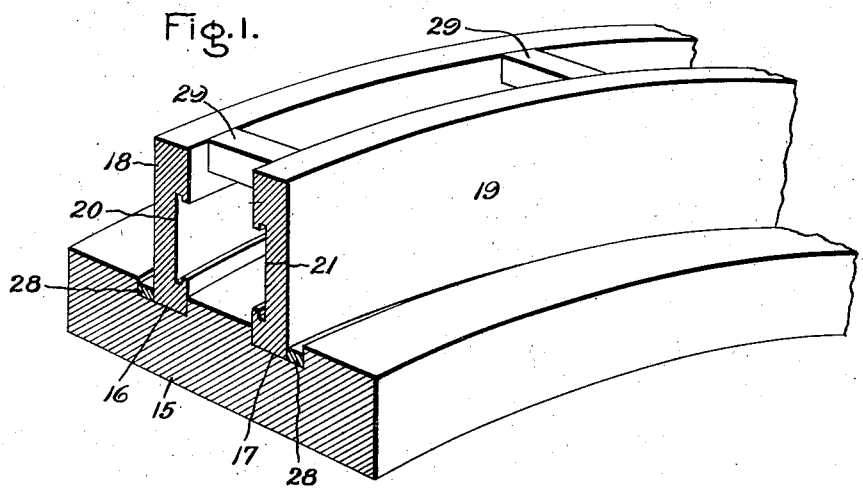
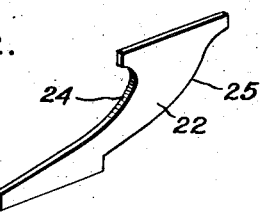
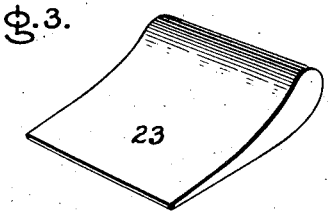
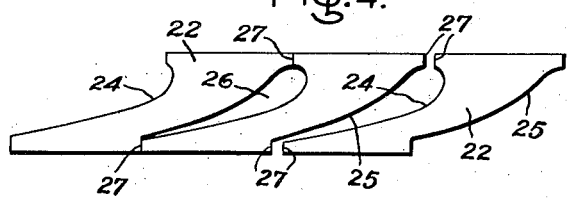
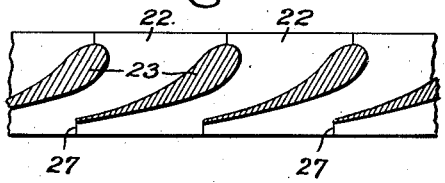
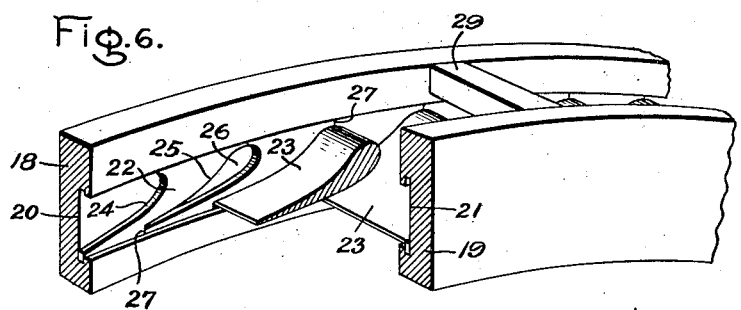
Inventor:
Christian Steenstrup,
by *[signature]*
His Attorney.

Oct. 9, 1923.
C. STEENSTRUP
1,470,508
METHOD OF MANUFACTURING TURBINE ELEMENTS
Filed Dec. 23, 1921  2 Sheets-Sheet 2
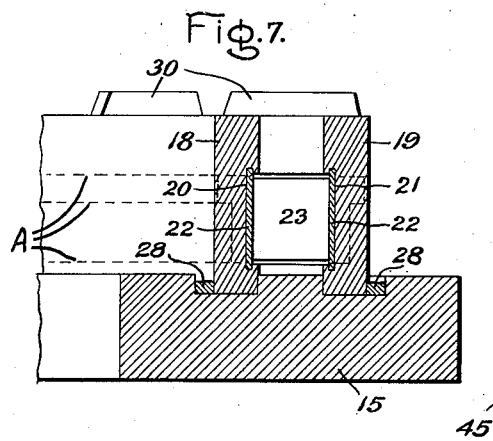
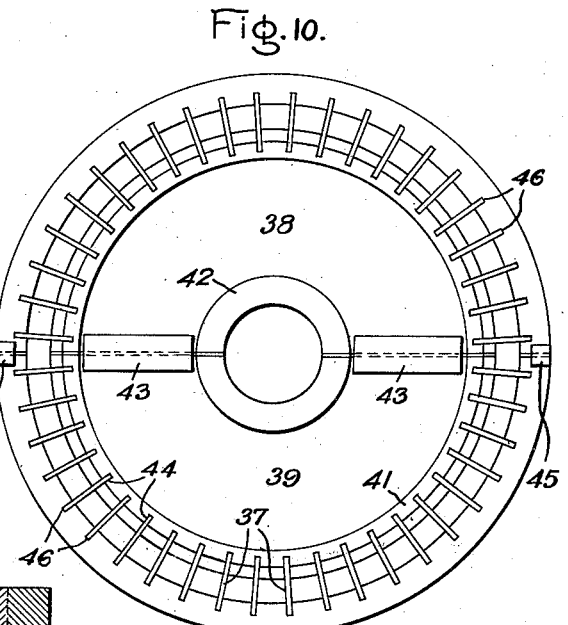
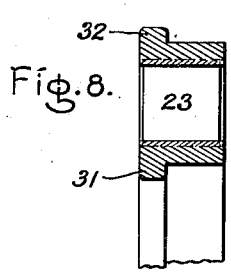
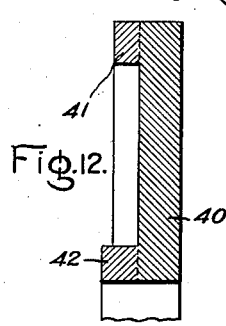
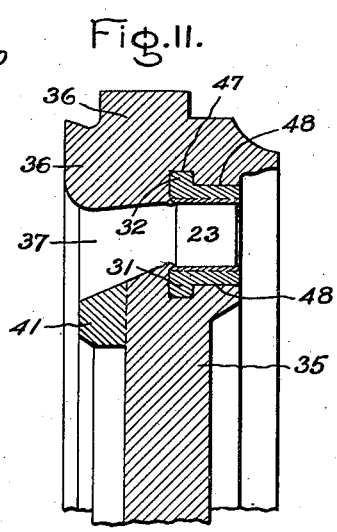
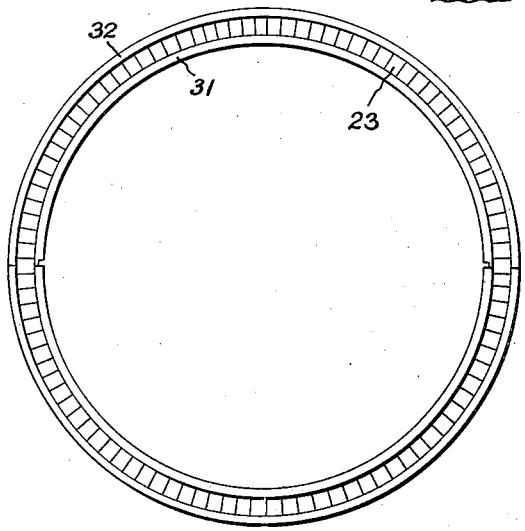
Inventor:
Christian Steenstrup,
by
His Attorney.

Patented Oct. 9, 1923.

1,470,508

UNITED STATES PATENT OFFICE.

CHRISTIAN STEENSTRUP, OF SCHENECTADY, NEW YORK, ASSIGNOR TO GENERAL ELECTRIC COMPANY, A CORPORATION OF NEW YORK.

METHOD OF MANUFACTURING TURBINE ELEMENTS.

Application filed December 23, 1921. Serial No. 524,397.

*To all whom it may concern:*

Be it known that I, CHRISTIAN STEENSTRUP, a citizen of the United States, residing at Schenectady, in the county of Schenectady, State of New York, have invented certain new and useful Improvements in Methods of Manufacturing Turbine Elements, of which the following is a specification.

The present invention relates to elastic fluid turbines and has for its object to provide an improved method of manufacturing certain parts or elements used in such turbines. My invention is particularly applicable to the manufacture of turbine diaphragms, and in the present application I have particularly illustrated and described it in this connection. It will be understood, however, that the invention is not necessarily limited to this use but may be utilized to manufacture any turbine part to which it may be found applicable.

For a consideration of what I believe to be novel and my invention, attention is directed to the accompanying description and the claims appended thereto.

In the drawing, Fig. 1 is a perspective view of supporting members used in carrying out my invention; Fig. 2 is a perspective view of a spacing member; Fig. 3 is a perspective view of a fluid directing member or nozzle partition; Fig. 4 is a side elevation of a number of spacing members illustrating the manner in which they are assembled and indicating also the way in which they may be formed from sheet material; Fig. 5 is a side elevation showing the manner in which the nozzle partitions are assembled between the spacing members, the nozzle partitions being shown in section; Fig. 6 is a perspective view illustrating the assembly of the nozzle partitions and spacing members in the holders shown in Fig. 1; Fig. 7 illustrates additional steps utilized in carrying out my invention; Fig. 8 illustrates a portion of a completed nozzle ring; Fig. 9 is a side elevation of a complete nozzle ring; Fig. 10 is a side elevation illustrating the manner of making the portion of the diaphragm which carries the nozzle ring shown in Fig. 9; Fig. 11 is a sectional view of a portion of a completed diaphragm, and Fig. 12 is a sectional view illustrating one way in which the inner ring of the diaphragm may be made.

In the drawing I have illustrated my improved method as being utilized to form a diaphragm having a complete ring of nozzles and I will specifically describe my invention as applied to the manufacture of such a diaphragm. It will be understood, however, that the method may be used in connection with any specific type of diaphragm it being only necessary to modify the method to fit any particular case.

Referring to the drawing, 15 indicates a holding member used in carrying out my invention but forming no part of the completed diaphragm. It may be in the form of an annular plate or ring, or a half ring, and is provided with two spaced concentric grooves 16 and 17 adapted to receive an edge of outer and inner supporting members 18 and 19. If the diaphragm is to contain a complete ring of nozzles, supporting members 18 and 19 are preferably in the form of half rings, two pairs of the half rings being utilized to form a complete nozzle ring. It will be understood that in general diaphragms of this type are formed in upper and lower halves to fit the respective halves of the turbine casing. Supporting members 18 and 19 are provided with undercut grooves 20 and 21.

In addition to the supporting members 18 and 19 I provide spacing pieces 22 and nozzle partitions 23. Spacing pieces 22 may be stamped from sheet material as is clear from an inspection of Fig. 4, and they are provided with concave surfaces 24 and convex surfaces 25 so that when assembled as illustrated in Figs. 4, 5 and 6 they provide openings 26 of a shape to receive the ends of nozzle partitions 23. Spacing pieces 22 are of a width equal to that of grooves 20 and 21 and are of a thickness to fit the undercut portion of such grooves. In the present instance the undercut portions of grooves 20 and 21 are shown as being rectangular but they may be of other suitable shape, the ends of the spacing pieces being shaped accordingly if found desirable. The spacing pieces entirely surround the ends of the nozzle partitions and have flat surfaces engaging each other as indicated at 27. Nozzle partitions 23 are suitably shaped to direct the elastic fluid and may be formed by taking strips of nozzle material and cutting them into suitable lengths.

The parts so far referred to are used in forming a nozzle member or fluid directing member of a diaphragm. In carrying out my method I take holding member 15 and mount thereon the two supporting members 18 and 19 which in the present instance are half rings of correct diameter to form a half nozzle ring. The supporting members 18 and 19 are fixed on holding member 15 in correct spaced relation to each other to form a nozzle member having nozzle partitions of the desired length. They may be fixed to holding member 15 in any suitable manner. In the present instance they are held in grooves 16 and 17 by means of calking strips 28. The nozzle partitions are of a length equal to the distance between the bottoms of grooves 20 and 21 so they fit tightly between the supporting members. Between the outer or free edges of members 18 and 19 I place blocks 29 which are of a length to spread the outer edges somewhat so they are slightly further apart than the inner edges which are fixed in grooves 16 and 17. Members 18 and 19 have sufficient resiliency to permit of this and of course are held under tension by blocks 29. This serves to spread slightly the bottom surfaces of grooves 20 and 21 so the nozzle partitions will fit readily between the two members 18 and 19 with their ends in the grooves without having to be driven into place. I next place a spacing member 22 in each of grooves 20 and 21 at one end of members 18 and 19 and fasten them in any suitable manner; I then place a nozzle partition 23 between members 18 and 19, the same extending crosswise from one to the other with its two ends in grooves 20 and 21. The nozzle partition is moved into engagement with the surfaces of the spacing members which serve to position it correctly and since members 18 and 19 are spread slightly by blocks 29 the nozzle partition can be moved into position without binding at the ends. Next two more spacing members are placed in grooves 20 and 21 and forced or driven firmly into engagement with the nozzle partition so the ends of the nozzle partition are held firmly between the two spacing members which, as will be seen from Fig. 6, entirely surround such ends and engage each other at the surfaces 27. Following this, additional nozzle partitions and spacing members are assembled after the manner described, and as shown in Fig. 6, until the entire nozzle member is built up. The nozzle partitions 23 when positioned are of less width than the width of the mouth of undercut grooves 20 and 21 so they may be put into place between members 18 and 19 by inserting them at an angle and then turning them to bring the ends into the grooves. The spacing members 22 may be slid in from the ends of slots 20 and 21 or when in any particular case their dimensions will permit it they may be inserted lengthwise into the slots and then turned to bring their ends into the undercut portions of the slots. I drive or force the spacing members tightly around the ends of the nozzle partition members so all the surfaces are in close, firm contact and preferably the spacing members are shaped so as to have more or less of a wedging action so they are tightly held in grooves 20 and 21.

After the structure has been assembled or built up in the manner described, I remove blocks 29 thereby permitting the supporting members 18 and 19 to spring together at their outer or free edges which results in bringing the members up hard against the ends of nozzle partitions 23 so the surfaces are held in close contact. I then place bars 30 on the outer edges of supporting members 18 and 19 which bars extend crosswise from one member to the other as shown in Fig. 7 and fasten the bars to the members by welding or other suitable means. A sufficient number of bars is used to firmly fasten members 18 and 19 together after which calking strips 28 are removed, the nozzle structure turned over, and some bars similar to bars 30 fixed on this side of the supporting members.

There is thus provided a built up nozzle structure firmly held together in what may be termed an initial or temporary manner and with the partition members accurately spaced and rigidly held.

I now permanently unite the nozzle partitions, spacing members and supporting members together by fusion of metal to form a unitary structure. Any suitable method of uniting by fusion of metal may be employed but preferably I unite them by employing the method disclosed in my application Ser. No. 354,014, filed Jan. 26, 1920. This method comprises placing the assembled structure in a suitable muffler containing a reducing atmosphere such as hydrogen and heating it, an alloying metal such as copper having been previously placed adjacent the joints between the parts to be united. When heated to a suitable temperature, the copper enters the interstices between the parts and unites them to each other to form in substance an integral structure. However, my invention is not necessarily limited to this specific method of permanently uniting the parts and it is to be understood that by the term, fusion of metal, I mean the particular method referred to or other suitable method.

After being permanently united by fusion of metal, the resulting unitary structure may be treated as an integral structure and finished to the desired shape. In the present instance the material outside the dotted lines A (Fig. 7) is removed leaving a nozzle structure having a section as shown in Fig. 8. In Fig. 8 and also in Fig. 11 I have shown the supporting members and spacing members with different sections to bring out the line between them but it will be understood that after being united by fusion of metal the seam or line of demarcation between the parts virtually disappears and for all practical purposes the parts are a unitary, integral structure, the strength of the joints between the materials being equal to or even greater than that of the material itself. As shown in Fig. 8, the nozzle member is finished to provide inner and outer flanges 31 and 32 by means of which it is to be attached to the other portion of the diaphragm. In Fig. 9 I have illustrated a complete nozzle ring comprising upper and lower halves, each half ring having been made after the manner described.

The other portion of the diaphragm, that is, the portion which carries the nozzle ring, comprises an inner ring 35 and an outer ring 36 held in spaced concentric relation to each other by bridge pieces 37 (see Fig. 11). This portion of the diaphragm is in general formed in upper and lower halves which are carried by the respective halves of the turbine casing.

According to my invention I form the inner ring 35 of two semi-circular flat plates 38 and 39. Each of these plates may with advantage be formed after the manner illustrated in Fig. 12 wherein I take a web member 40 and unite thereto at its periphery a reinforcing ring member 41 and at its bore a reinforcing ring member 42. These members 41 and 42 are united to the web member by fusion of metal so as to form in substance a single integral structure. By this means I provide a diaphragm member having the required thickness at its bore or center and at its periphery from the least possible amount of material. Furthermore, by this arrangement not only is a substantial amount of material saved but the amount of machine work is reduced to a minimum. Web member 40 may be in the form of a ring which is afterwards cut in two or it may be in the form of a half ring as found desirable.

I take the two half diaphragm members 38 and 39 which as already stated may be formed after the manner shown in Fig. 12, and place them together to form a complete ring, a suitable substance such as mica being placed in the seam or joint to keep them from being united to each other by fusion of metal as referred to hereinafter and I fasten them to each other by welding one or more strips 43 over the joint as shown in Fig. 10 or in any other suitable way. The periphery of the ring thus formed is then finished to the desired shape and dimensions after which it is slotted as indicated at 44 to receive the bridge pieces 37. I then provide an outer ring member 36 which may be either a single piece continuous ring or a ring made up from two half rings suitably fastened together. In the latter case which is the one illustrated in Fig. 10, the two half rings are fastened together by means of plates 45 welded over the joints, there being mica or similar substances in the joint for the purpose referred to above. In either case the inner surface of the outer ring is finished to the desired shape and slotted as indicated at 46 to receive the bridge pieces 37. The inner and outer rings are then placed in concentric relation to each other with slots 44 and 46 in alignment and the bridge members 37 put into place with their edges in slots 44 and 46 as shown in Fig. 10. The bridge members make a good fit in the slots so when the structure is fully assembled, it is strong and rigid. I next unite the bridge members to the rings by fusion of metal, preferably in the manner already described in connection with the nozzle ring after which the structure is finished to bring it to the desired shape. In finishing as soon as the strips 43 and plates 45 are cut away, the structure will separate into two halves since the presence of the mica or other similar material in the joints prevents them, during the uniting by fusion of metal process, from being joined together. This portion of the diaphragm structure is finished to the desired contour and is provided with opposed grooves 47 adapted to receive projections 31 and 32 on the nozzle ring. The respective halves of the nozzle ring are then mounted on the halves of the other portion of the diaphragm structure as shown in Fig. 11, the half nozzle rings being located between surfaces 48 with their projections 31 and 32 in grooves 47. For this assembling operation the half rings are started at one end with their projections in grooves 47 and slid around.

I have referred to the members 18 and 19 as being half rings but in actual practice I preferably make each part slightly greater than a half circle so as to provide material at the two ends which may be cut away to finish the ends and bring the structure to exact dimensions after the structure has been united by fusion of metal.

In accordance with the provisions of the patent statues, I have described the principle of operation of my invention, together with the particular method which I now consider to represent the best manner for carrying it out, but I desire to have it understood that the particular method disclosed is only illustrative and that the invention may be carried out with such modifications as come within the scope of the appended claims.

What I claim as new and desire to secure by Letters Patent of the United States is:—

1. The method of forming a turbine part which comprises taking a supporting member having an undercut groove in one of its surfaces, mounting fluid-directing elements on the supporting member with their ends in said groove and with spacing members between the ends, said spacing members lying in said groove with their ends in the undercut portions of the groove and serving to hold the fluid-directing members in position, and then uniting the structure by fusion of metal.

2. The method of forming a turbine part which comprises taking a supporting member having an undercut groove in one of its surfaces, fluid-directing elements, and spacing members, said fluid-directing elements when positioned having a width in a transverse direction not greater than the width of the mouth of the groove, and said spacing members being of dimensions to lie in the groove with their ends in the under-cut portions of it, mounting ends of the fluid directing elements and the spacing members in the groove with the ends of fluid-directing elements between the spacing members and then uniting the built-up structure by fusion of metal.

3. The method of forming a turbine part which comprises taking a supporting member having an undercut groove in one of its surfaces, fluid-directing elements and spacing members, said fluid-directing elements when positioned having a width in a transverse direction not greater than the width of the mouth of the groove, said spacing members being of dimensions to lie in the groove with their ends in the undercut portions of it, mounting ends of the fluid-directing elements and the spacing members in the groove with the ends of fluid-directing elements between the spacing members, said spacing members surrounding such ends and fitting tightly between them and the sides of the groove, and then uniting the built-up structure by fusion of metal.

4. The method of forming a turbine part which comprises mounting two grooved supporting members in spaced relation to each other with the grooves opposed, placing the ends of fluid-directing elements and spacing members in the grooves with the ends of fluid-directing elements between the spacing members, said fluid-directing elements extending transversely from one supporting member to the other, and then uniting the built-up structure by fusion of metal.

5. The method of forming a turbine part which comprises taking two supporting members each having a groove and mounting them in spaced relation to each other, with the grooves facing each other, placing fluid-directing elements between the supporting members with their ends in said grooves, and then uniting the fluid-directing elements and supporting members by fusion of metal.

6. The method of manufacturing a turbine part which comprises taking a holding member, mounting two supporting members thereon in spaced relation to each other with one edge of each supporting member fixed to the holding member and the other edge free, holding the free edges so they are spaced apart more than the fixed edges, assembling fluid directing elements between the supporting members, releasing the free edges of the supporting members so the supporting members may spring together to tightly grip the fluid directing elements, and then uniting the assembled structure by fusion of metal.

7. The method of manufacturing a turbine part which comprises taking a holding member, mounting two supporting members thereon in spaced relation to each other, with one edge of each supporting member fixed to the holding member and the other edge free, said supporting members being provided with grooves in their closed surfaces, holding the free edges of the supporting members so they are spaced apart more than the fixed edges, assembling fluid directing elements between the supporting members, with their ends in said grooves and with spacing members in the grooves between the ends, releasing the free edges of the supporting members so the free edges may spring together to tightly grip the fluid directing elements, and then uniting the assembled structure by fusion of metals.

8. The method of manufacturing a turbine part which comprises mounting two supporting members in spaced relation to each other, said members having grooves in their opposed surfaces, assembling elements between the supporting members with their ends fixed in the grooves, and then uniting the assembled structure by fusion of metal.

9. The method manufacturing a turbine part which comprises mounting two supporting members in spaced relation to each other, said members having spaced transversely extending grooves in their opposed surfaces, assembling elements between the supporting members with their ends in said grooves, and then uniting the assembled structure by fusion of metal.

10. The method of manufacturing a member for use in constructing the inner ring of a diaphragm which comprises taking a plate, mounting reinforcing pieces on the plate adjacent its periphery and bore and then permanently uniting them thereto by fusion of metal.

In witness whereof I have hereunto set my hand this 21st day of December, 1921.

CHRISTIAN STEENSTRUP.